United States Patent [19]
Flood

[11] 3,889,397
[45] June 17, 1975

[54] DEVICE FOR COMPOSING TRACEABLE FORMS

[76] Inventor: Janet M. Flood, 323 Medford Ave., Hayward, Calif. 94541

[22] Filed: Sept. 23, 1974

[21] Appl. No.: 508,688

[52] U.S. Cl. .......................................... 35/26; 35/28
[51] Int. Cl. ............................................ G09b 11/04
[58] Field of Search .............. 35/26, 28, 53, 66, 37; 40/125 A; 281/38; 46/36, 37

[56] References Cited
UNITED STATES PATENTS

| | | | |
|---|---|---|---|
| 1,421,975 | 7/1922 | Meyers | 35/26 UX |
| 2,543,998 | 3/1951 | Shulman | 35/26 |
| 3,248,809 | 5/1966 | Stifano | 35/75 |
| 3,353,281 | 11/1967 | Schulze | 35/28 |
| 3,419,971 | 1/1969 | Ribken | 35/26 |

Primary Examiner—Harland S. Skogquist
Attorney, Agent, or Firm—Joseph B. Gardner; Theodore J. Bielen, Jr.; Richard Esty Peterson

[57] ABSTRACT

A device for composing designs, characters, forms, and the like, utilizing a pad, a plurality of transparent sheets and tabs having imprinted segments of the design, character form, and the like. The tabs are interposed between the pad and sheets to combine the segments and to form the finished design, character, and the like, which are traceable with tracing paper.

4 Claims, 3 Drawing Figures

DEVICE FOR COMPOSING TRACEABLE FORMS

BACKGROUND OF THE INVENTION

The present invention relates to a device for compositions of basic forms and designs particularly, but not limited to, cartoon characters and the like.

Most educators agree that a child's penchant for playing may be successfully employed to teach the child useful knowledge. It is also commonly known that a complex idea or principle may be more easily taught any student using a step by step process and using exemplars. Thus the pupil is not overwhelmed and discouraged by an apparently unattainable comprehension of such complex ideas.

The tracing principle is well-known in the teaching field as an educational tool. Since tracing allows the learner to accomplish a result that would be practically impossible otherwise. Hence, he benefits from a successful learning experience that reinforces further learning.

Prior tracing devices fall short of their educational potential since they lack imagination and accord little or no creativity on the part of the student. Consequently, the student merely learns to trace lines instead of combining forms and designs to produce a variety of artistic entities.

SUMMARY OF THE INVENTION

The present invention provides a device to teach complex visual structures to students of art by using the principle of tracing and the step by step creation of a finished design, character, form, or the like.

The device includes a backing piece with a plurality of overlying, transparent sheets having a durable surface which will resist punctures by a drawing implement.

Components of a finished design, character, form, or the like contained on transparent tabs are placed beneath the transparent sheets to create the desired finished form. Any number of components are available for this fabrication, much the same as letters of the alphabet integrate to form a word. Finally, the user places tracing paper and copies the final composition.

For example, in forming a cartoon character the student chooses a particular body shape, a particular head, each of the facial features such as eyes, nose, mouth, ears pre-printed on the transparent tabs. The student combines these parts to make the desired character.

It is therefore an object of the present invention to provide a device which may be used to create forms, characters, and designs from a pool of known segments.

It is a further object of the present invention to provide an educational tool which will aid in teaching students of art the creation of forms, characters, and designs.

Yet another object of the present invention is to provide a device which may be used to develop creative expression, motor skills, self-confidence, and concentration in children.

Yet another object of the present invention is to fuse the skill of tracing with creative expression to produce a learning experience for students in the educational system.

The invention possesses other objects and advantages, especially as concerns particular features and characteristics thereof which will become apparent as the specification continues.

DESCRIPTION OF THE PREFERRED EMBODIMENT

Figure 1:
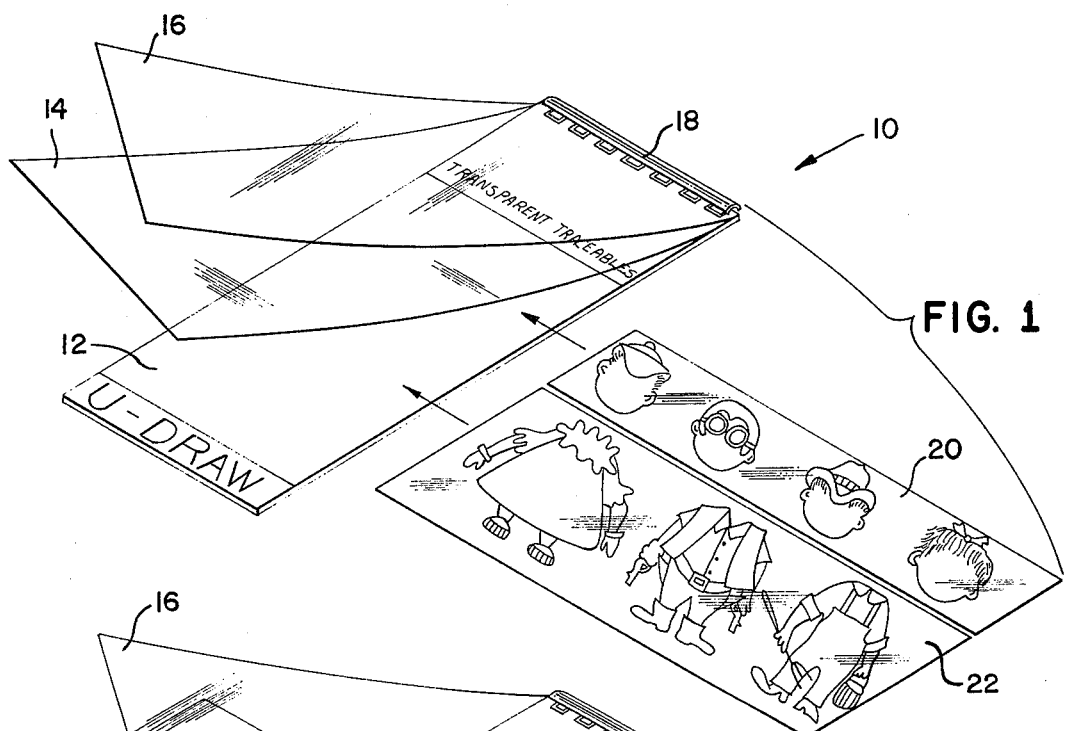
FIG. 1 is a perspective view of the invention with the component parts disassembled.

With reference to FIG. 5, 1-3, the device in its entirety is denoted by reference character 10. The device 10, depicted most clearly in FIG. 1, comprises a pad 12 of preferably opaque material suitable to serve as a drawing surface such as paper, vinyl, plastic, and the like. A plurality of transparent sheets, shown here by sheets 14 and 16, are preferably hingedly attached to pad 12. Sheets 14 and 16 flip down to cover the pad 12, one overlying the other. Any durable transparent material, such as Mylar, may be employed to form the sheets.

A hinge means 18 allows the sheets 14 and 16 to easily swing up and down individually in relation to the pad 12.

Figure 2:
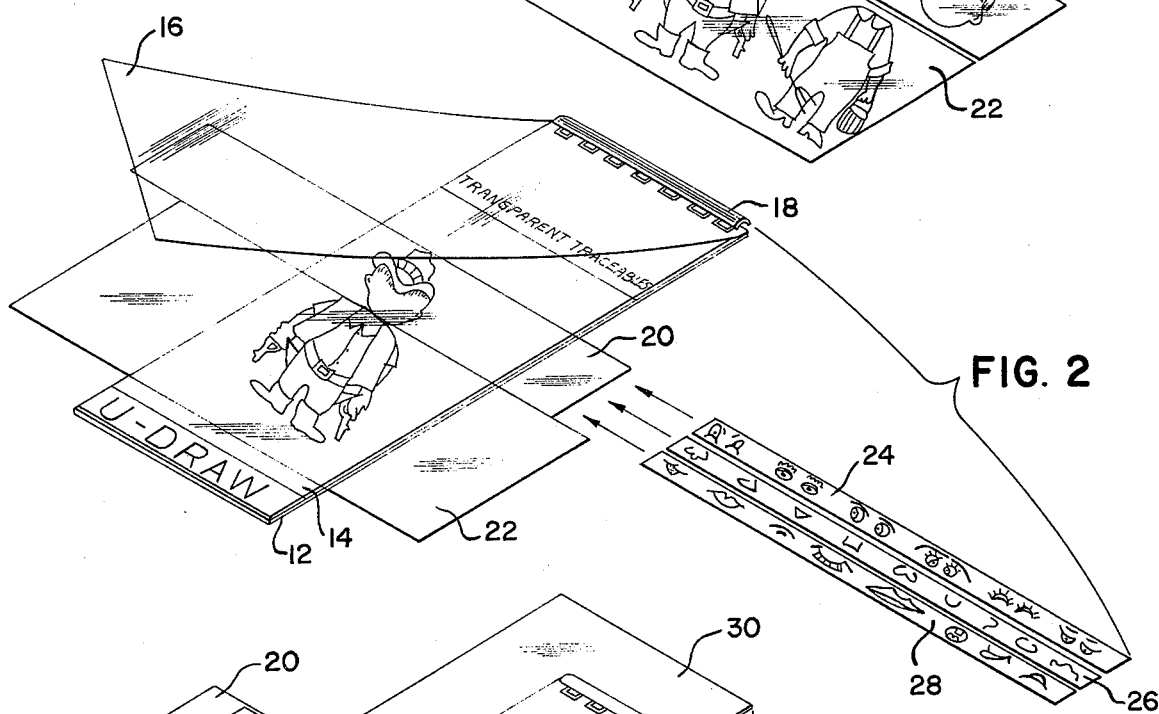
FIG. 2 is a perspective view of the invention partially assembled.

Tabs 20 and 22 move, as shown by the arrows in FIG. 1, to sit between the sheet 14 and pad 12 with the sheet above and the pad below the tabs, as shown in FIG. 2. Permanently imprinted on the tabs are segments of a form or design such as a cartoon character, as shown in the FIGS. 1-3. For example, tab 20 depicts various shaped heads without facial features, having different hairdos, ears, glasses, hats, etc. Tab 22 depicts many types of body shapes wearing several modes of dress such as overalls, pants, boots, vests and the like. The hands hold an array of implements corresponding to the mode of dress possessed by the body shape.

The tabs are transparent with the exception of the portion having the printed design, form or the like.

Another set of tabs 24, 26, 28 overly the sheet 14 and the tabs 20 and 22. In the preferred embodiment, they move in place over tab 20 as shown by the arrows in FIG. 2. The tabs 24, 26, 28 are likewise constructed of a transparent material such as Mylar. Tab 24 displays various pairs of eyes while tabs 26 and 28 show noses and mouths to complete the character.

As mentioned heretofore, the tabs may contain any components of designs, shapes, forms and the like and may be inserted between any number of sheets to form the final composition.

Tracing sheet 30 lies on top of the sheets 14 and 16 and the pad 12. The sheet may be paper or similar material that allows a writing implement to make an impression thereon according to the contours of the lines on the tabs below, and the tracing sheet, which are visible to the eye of the tracer above.

In operation, the person using the device lifts transparent sheets 14 and 16 from the pad 12 so that the sheets do not cover the pad 12. The user has the option of choosing, in the case of creating a cartoon character, a body design from tab 22. The tab 22 is placed over the pad 12 with the chosen body design centered and resting firmly atop the pad 12. Likewise, the user selects a head design from those shown on tab 20 and places it on top of pad 12 with the head immediately above the neck of the body design of tab 22. Transparent sheet 14 flips over the emplaced tabs to hold them firmly in place; the combined design being clearly visible to the user, as shown in FIG. 2.

To complete the facial expression of the character being concocted, the user chooses eyes, nose, and mouth from tabs 24, 26, and 28. He places the tabs on sheet 14 such that the desired feature lies above the portion of the face found on tab 20, which is visible to the user. Sheet 16 flips down over the tabs and holds them in place, much the same as sheet 14. The top sheet 16 may be held down to allow the user to slide any one of the tabs laterally in order to compare successive expressions afforded by the variety of features found on each tab. For example, different types of noses may be viewed on a particular head. Alternatively, the tabs may be inverted to display further transformations.

Although a cartoon character was described in the preferred embodiment, it is understood that the creation of other forms may entail more or less of a number of tabs and transparent sheets.

Figure 3:
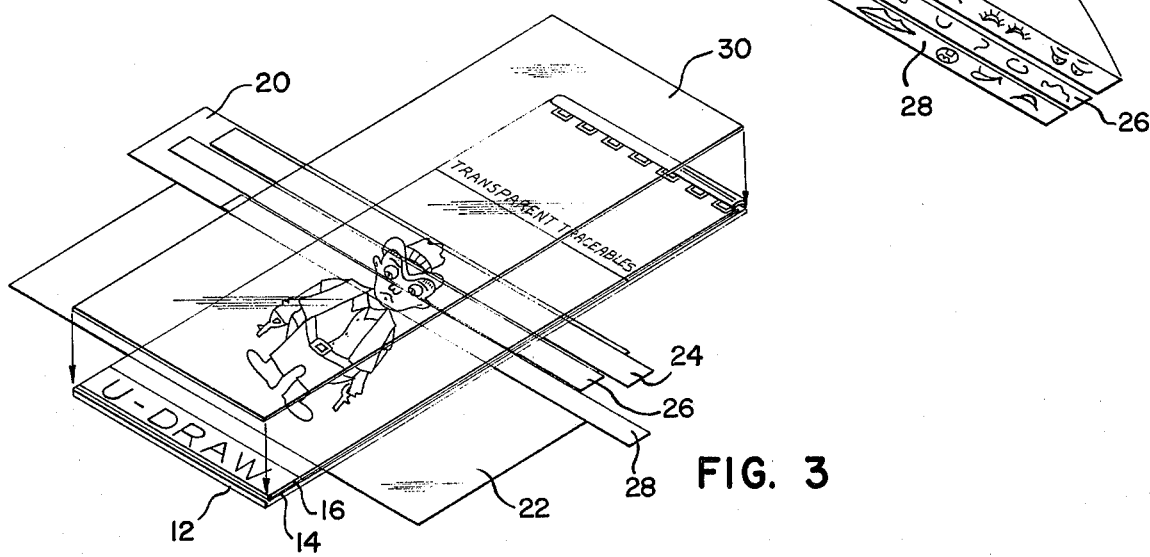
FIG. 3 is a perspective view of the invention in its assembled condition.

Finally, the user covers the completed character with tracing paper 30, as shown in FIG. 3 and traces the combined form. The traced figure on the tracing paper 30 lends itself to coloration, cutting out, creating stories with characters, and the like.

While in the foregoing specifications, embodiments of the invention have been set forth in considerable detail for purposes of making a complete disclosure of the invention so it will be apparent to those skilled in the art that numerous changes may be made in such details without departing from the spirit and principles of the invention.

What is claimed is:

1. A device for composing designs, characters, forms and the like traceable with tracing paper composing:
   a. A pad
   b. A plurality of substantially transparent tabs having segments of the design, characters, form and the like imprinted thereon.
   c. A plurality of transparent sheets, said tabs interposed said pad and said transparent sheets such that the segments of said tabs are visible when viewed through said sheets to said pad permitting tracing of the segments with the tracing paper.

2. The device of claim 1 in which each of said tabs contains a variety of a particular segment adjacent one another.

3. The device of claim 2 in which each of said sheets is hingedly attached to said pad such that said sheet may overlie and swing away from said pad.

4. The device of claim 3 in which each of said tabs is in slideable relationship with said pad and said sheets permitting quick comparison of said variety of a particular segment.

* * * * *